United States Patent
Senoh et al.

(10) Patent No.: US 8,405,990 B2
(45) Date of Patent: Mar. 26, 2013

(54) BLOWER AND ELECTRIC APPARATUS INCLUDING THE SAME

(75) Inventors: Toshiya Senoh, Nara (JP); Jun Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 225 days.

(21) Appl. No.: 12/972,650

(22) Filed: Dec. 20, 2010

(65) Prior Publication Data

US 2011/0211312 A1 Sep. 1, 2011

(30) Foreign Application Priority Data

Feb. 26, 2010 (JP) ................................. 2010-042660

(51) Int. Cl.
*H05K 7/20* (2006.01)
(52) U.S. Cl. ........................................ 361/696; 361/695
(58) Field of Classification Search ........................ None
See application file for complete search history.

(56) References Cited

U.S. PATENT DOCUMENTS

| | | | | |
|---|---|---|---|---|
| 4,327,398 A * | 4/1982 | Christison | ..................... | 361/695 |
| 5,867,365 A * | 2/1999 | Chiou | ........................... | 361/690 |
| 5,979,341 A * | 11/1999 | Nagato et al. | ................. | 110/245 |
| 6,472,781 B2 | 10/2002 | Yamamoto | | |
| 6,778,690 B1 * | 8/2004 | Ladak et al. | .................. | 382/131 |
| 7,362,568 B2 * | 4/2008 | Huang | ..................... | 361/679.48 |
| 7,589,965 B2 * | 9/2009 | Liang et al. | .................... | 361/695 |
| 7,969,730 B1 * | 6/2011 | Doherty et al. | ........... | 361/679.54 |
| 2004/0105233 A1 * | 6/2004 | Lai | ................................. | 361/695 |
| 2005/0207124 A1 * | 9/2005 | Ohnishi et al. | ................ | 361/719 |
| 2006/0146493 A1 | 7/2006 | Wang et al. | | |
| 2007/0206353 A1 * | 9/2007 | Boone et al. | .................. | 361/694 |
| 2007/0238619 A1 * | 10/2007 | Xiong | ........................... | 505/100 |
| 2009/0002940 A1 * | 1/2009 | Kobayashi et al. | .......... | 361/687 |
| 2010/0084123 A1 | 4/2010 | Shishido et al. | | |
| 2010/0182748 A1 * | 7/2010 | Huang | ......................... | 361/690 |

FOREIGN PATENT DOCUMENTS

| | | |
|---|---|---|
| CN | 2743510 | 11/2005 |
| CN | 2800357 | 7/2006 |
| CN | 1979378 | 6/2007 |
| CN | 201725269 | 1/2011 |
| EP | I628514 A2 | 2/2006 |
| JP | 2000-082888 | 3/2000 |
| JP | 2006-054215 | 2/2006 |
| TW | 200819634 | 5/2008 |

* cited by examiner

*Primary Examiner* — Gregory Thompson
(74) *Attorney, Agent, or Firm* — Hamre, Schumann, Mueller & Larson, P.C.

(57) ABSTRACT

A blower includes a fan, an inlet through which air is drawn into the fan, and an outlet through which an air flow from the fan is exhausted. The inlet and the outlet have slits with a specific width or an array of through holes with a specific diameter. The relationship A <C, A <B is satisfied, where A represents the width of the slits or the diameter of the through holes of the inlet, B represents a minimum particle size of dust that would compromise the dust-proof performance of the fan, and C represents the width of the slits or the diameter of the through holes of the outlet. The blowing performance can be improved within the range of dust-proof performance in which damage or functional degradation can be avoided.

12 Claims, 10 Drawing Sheets

BLOWER AND ELECTRIC APPARATUS INCLUDING THE SAME

BACKGROUND OF THE INVENTION

1. Field of the Invention

The present invention relates to a blower that includes a fan to draw air from an inlet and exhausts air through an outlet, and an electric apparatus that includes the blower.

2. Description of Related Art

For example, in the case of a notebook PC as an example of the electric apparatus, the amount of heat generated from a heat generating element such as a CPU increases as the performance of the notebook PC is improved. Therefore, it is likely that the configuration of a conventional heat dissipation device cannot dissipate heat sufficiently. Thus, a high-performance heat dissipation unit has been demanded. When the heat dissipation unit uses an air flow produced by a fan, the shape and arrangement of a heat dissipation fin, the interrelationship between the heat dissipation fin and a blowing fan (cooling fan), or the like have to be optimized.

Figure 14:
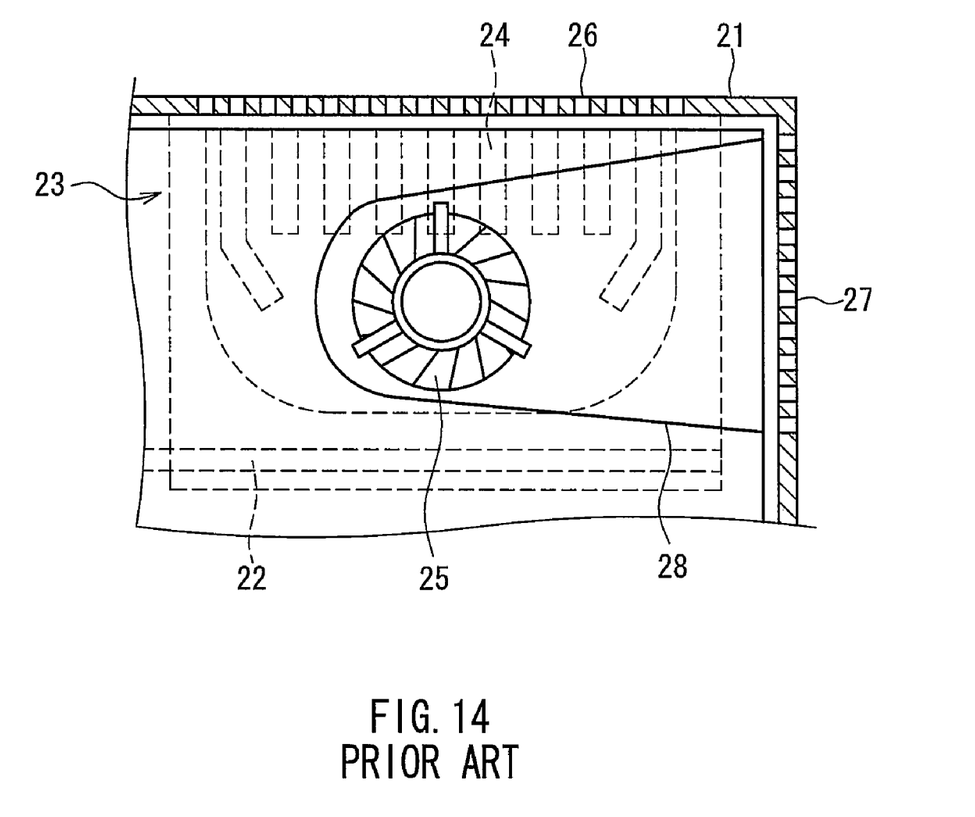
FIG. 14 is a plan view of a conventional electric apparatus, in which a heat dissipation unit is illustrated in a schematic cross-sectional view.

Moreover, in the case of the electric apparatus for which compactness is critical such as the notebook PC, the arrangement of the blowing fan and the heat dissipation fin is limited strictly. Under these circumstances, e.g., JP 2000-082888 A discloses a heat dissipation device having a space-saving structure, as shown in FIG. 14.

In this heat dissipation device, heat is transferred from a heat generating element (not shown) located inside a metal case 21 to a heat dissipation fin 24 of a heat dissipation portion 23 by a heat pipe 22, and then dissipated by the air flow from a blowing fan 25. The heat dissipation portion 23 is located close to the blowing fan 25 and integrated with the metal case 21. An inlet 26 and an outlet 27 are provided in the side walls of the metal case 21. The inlet 26 and the outlet 27 are connected by a duct 28 via the blowing fan 25. The blowing fan 25 draws air from the inlet 26 to cool the heat dissipation portion 23 and then exhausts the air through the outlet 27.

With this configuration, the thermal conductivity of the case 21 made of metal is used effectively for the heat dissipation portion 23 of the heat dissipation device, and the blowing fan 25 is located close to the heat dissipation portion 23. Thus, the space saving can be achieved, and also the cooling efficiency can be improved. Moreover, since the inlet 26 and the outlet 27 are provided in the side walls that are at right angles to form a corner of the metal case 21, both air intake and air exhaust can be performed efficiently by the blowing fan 25, which is effective in improving the cooling efficiency.

However, in the heat dissipation device having the above configuration, JP 2000-082888 A merely discloses that the blowing fan is integrated with the heat dissipation portion, and does not particularly refer to the slit widths of the inlet and the outlet. The slit widths of the inlet, the outlet, and the heat dissipation fin need to be optimized not only to improve the cooling efficiency, but also to achieve the space saving in the heat dissipation unit that uses the air flow produced by the blowing fan.

Although the cooling performance of the heat dissipation unit may be improved by making the inlet and the outlet larger, there is the problem of dust entering easily. In particular, when the electric apparatus is used outdoors, rain, dust, dirt, or the like can enter the apparatus and make it difficult to operate the heat dissipation unit using the blowing fan. If dust enters the apparatus, the blowing fan or the heat dissipation fin becomes clogged or damaged, and proper heat dissipation likely cannot be performed.

Therefore, it is desirable that the inlet and the outlet have the largest possible size while taking into account the conditions required from the allowable size of dust, the slit width of the heat dissipation fin, or the like in view of the dust-proof performance of the blowing fan (i.e., the blowing fan is not substantially affected by dust).

The above problem is not limited to the heat dissipation unit that uses the heat dissipation fin for cooling in the notebook PC. The same problem also is present in a blower that includes a fan to draw air from an inlet and exhausts air through an outlet and in an electric apparatus that includes the blower.

SUMMARY OF THE INVENTION

With the foregoing in mind, it is an object of the present invention to provide a blower that is configured to improve the blowing performance within the range of dust-proof performance in which damage or functional degradation of a fan can be avoided.

A blower of the present invention includes the following: a fan; an inlet through which air is drawn into the fan; and an outlet through which an air flow from the fan is exhausted. The inlet and the outlet have slits with a specific width or an array of through holes with a specific diameter. The relationship $A < C$, $A < B$ is satisfied, where A represents the width of the slits or the diameter of the through holes of the inlet, B represents a minimum particle size of dust that is would compromise the dust-proof performance of the fan, and C represents the width of the slits or the diameter of the through holes of the outlet.

An electric apparatus of the present invention includes the following: a partitioned chamber that is formed by separating the inside of a main unit case with a partition; a heat-exchange element that is located in the partitioned chamber; and a blower that is located in the partitioned chamber to send air to the heat-exchange element. The blower includes the following: a fan; an inlet communicating with the partitioned chamber, through which outside air is drawn and sent by the fan; and an outlet communicating with the partitioned chamber, through which an air flow sent from the fan is exhausted. The inlet and the outlet have slits with a specific width or an array of through holes with a specific diameter. The relationship $A < C$, $A < B$ is satisfied, where A represents the width of the slits or the diameter of the through holes of the inlet, B represents a minimum particle size of dust that would compromise the dust-proof performance of the fan, and C represents the width of the slits or the diameter of the through holes of the outlet. The heat-exchange element is located between the fan and the outlet.

An electric apparatus having another configuration of the present invention includes the following: a partitioned chamber that is formed by separating the inside of a main unit case with a partition; and a blower that is located in the partitioned chamber. The blower includes the following: a fan; an inlet communicating with the partitioned chamber, through which outside air is drawn and sent by the fan; and an outlet communicating with the partitioned chamber, through which an air flow sent from the fan is exhausted. The inlet and the outlet have slits with a specific width or an array of through holes with a specific diameter. The relationship $A < C$, $A < B$ is satisfied, where A represents the width of the slits or the diameter of the through holes of the inlet, B represents a minimum particle size of dust that would compromise the dust-proof performance of the fan, and C represents the width of the slits or the diameter of the through holes of the outlet. The inlet includes a dust collecting element that collects dust.

With the above configurations, the inlet, the dust-proof performance of the fan, and the outlet satisfy the relationship A<C, A<B. Thus, the dimensions of each of the inlet and the outlet can be determined so as to maximize the blowing performance without causing damage or a reduction in the function of the fan.

DETAILED DESCRIPTION OF THE INVENTION

Based on the above configurations, the blower or electric apparatus of the present invention can have the following aspects.

In the blower or electric apparatus with the above configurations, it is preferable that the relationship C≦B is satisfied.

In the electric apparatus with the above configuration, the heat-exchange element may be a heat dissipation fin that dissipates heat transferred from a heat generating element located inside the main unit case.

Moreover, it is preferable that the relationship C≦D is satisfied, where D represents a gap width between two adjacent fins of the heat dissipation fin.

Moreover, the heat-exchange element may be configured to generate heat.

Moreover, the partitioned chamber may be formed in a corner area in a plan view of the main unit case by separating the inside of the main unit case with the partition, and may be sealed from an internal space of the main unit case.

Moreover, the inlet may be provided in a side wall that forms one side of the corner area, and the outlet may be provided in a side wall that forms the other side that intersects the one side provided with the inlet.

Moreover, the partition for partitioning the partitioned chamber may be formed of a partition member different from the main unit case, and the partition member may surround the partitioned chamber to form a closed space.

Hereinafter, embodiments of the present invention will be described with reference to the drawings.

Embodiment 1

Figure 1:
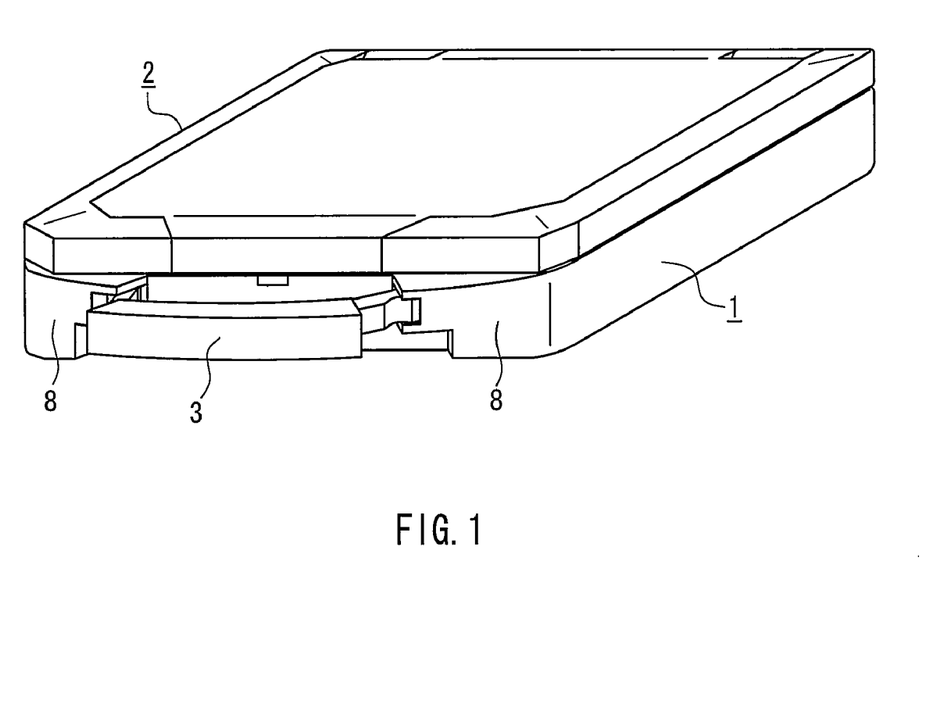
FIG. 1 is a perspective view showing a non-operating state of a notebook PC that is an application example of a blower in Embodiment 1 of the present invention.
Figure 2:
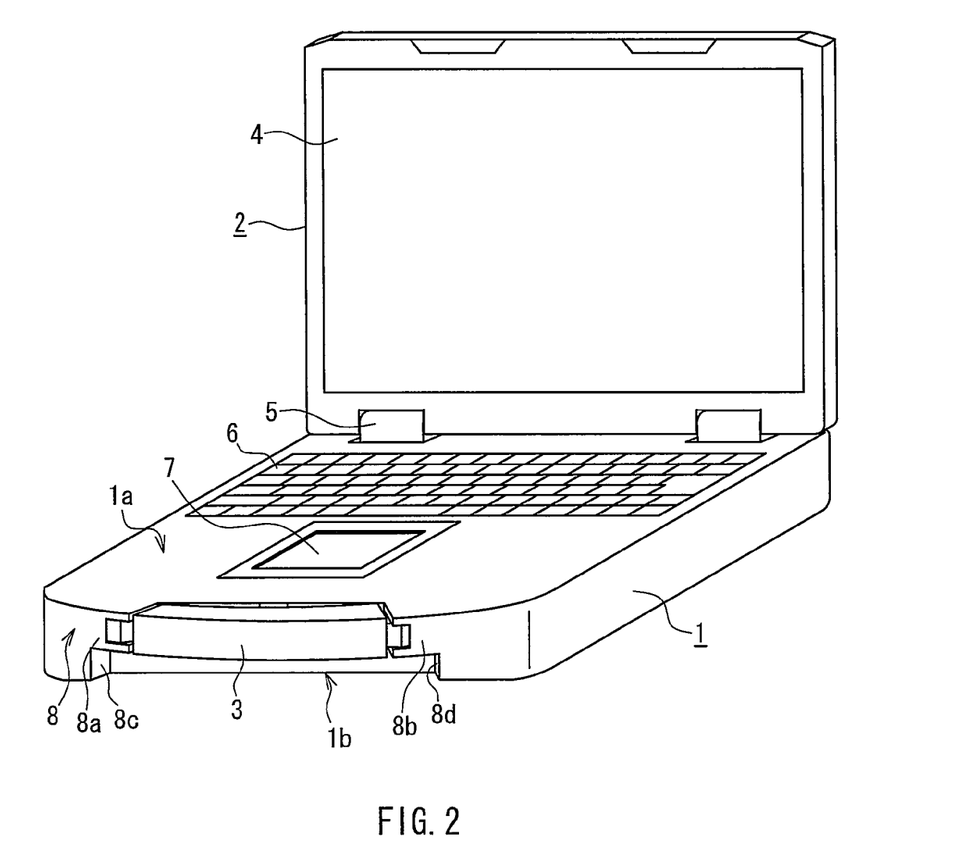
FIG. 2 is a perspective view showing an operating state of the notebook PC.

FIG. 1 is a perspective view showing the appearance of a notebook PC as an example of an electric apparatus in Embodiment 1. The notebook PC includes a main unit case 1, a display unit case 2, and a hand grip 3. FIG. 1 shows a non-operating state. FIG. 2 is a perspective view of the notebook PC in an operating state. The upper side and the lower side of the main unit case 1 when the notebook PC is in the operating state are defined as a main unit upper surface 1a and a main unit lower surface 1b, respectively.

The main unit case 1 contains a CPU, a circuit board on which various electric elements are mounted, a hard disk drive, a battery, or the like. The display unit case 2 is provided with a liquid crystal display 4 for displaying images, characters, or the like. The display unit case 2 is supported rotatably by the main unit case 1 with hinges 5. A keyboard 6 and a pointing device 7 are provided on the main unit upper surface 1a.

The pointing device 7 is fixed in the main unit case 1 with its operating surface exposed on the surface of the main unit case 1. It is desirable that the main unit case 1 is molded of a light metal such as aluminum or magnesium or an alloy thereof so as to maintain the ruggedness of the notebook PC.

A pair of grip holders 8 is formed on one side of the main unit case 1. The grip holders 8 are spaced from each other and protrude from the side of the main unit case 1 to form convex portions. The hand grip 3 is connected between the grip holders 8 and grasped by the user's hand for carrying the notebook PC.

The grip holders 8 have connecting portions 8a, 8b (see FIG. 2), to which the hand grip 3 is connected. Each one of the connecting portions 8a, 8b is provided at a position shifted toward the main unit upper surface 1a and extends to the other grip holder 8. The hand grip 3 is connected to the connecting portions 8a, 8b, and therefore supported on the side of the main unit case 1 in a position shifted toward the main unit upper surface 1a. Thus, in the posture of the notebook PC shown in FIG. 1, a space is formed between the hand grip 3 and the surface on which the notebook PC is placed. This makes it easy for a user to put his/her fingers in that space when carrying the notebook PC. Moreover, the hand grip 3 and the connecting portions 8a, 8b are connected movably to each other. Accordingly, the hand grip 3 can be retracted toward the main unit case 1 (see FIG. 2) and extended from the main unit case 1 (see FIG. 1).

Figure 3:
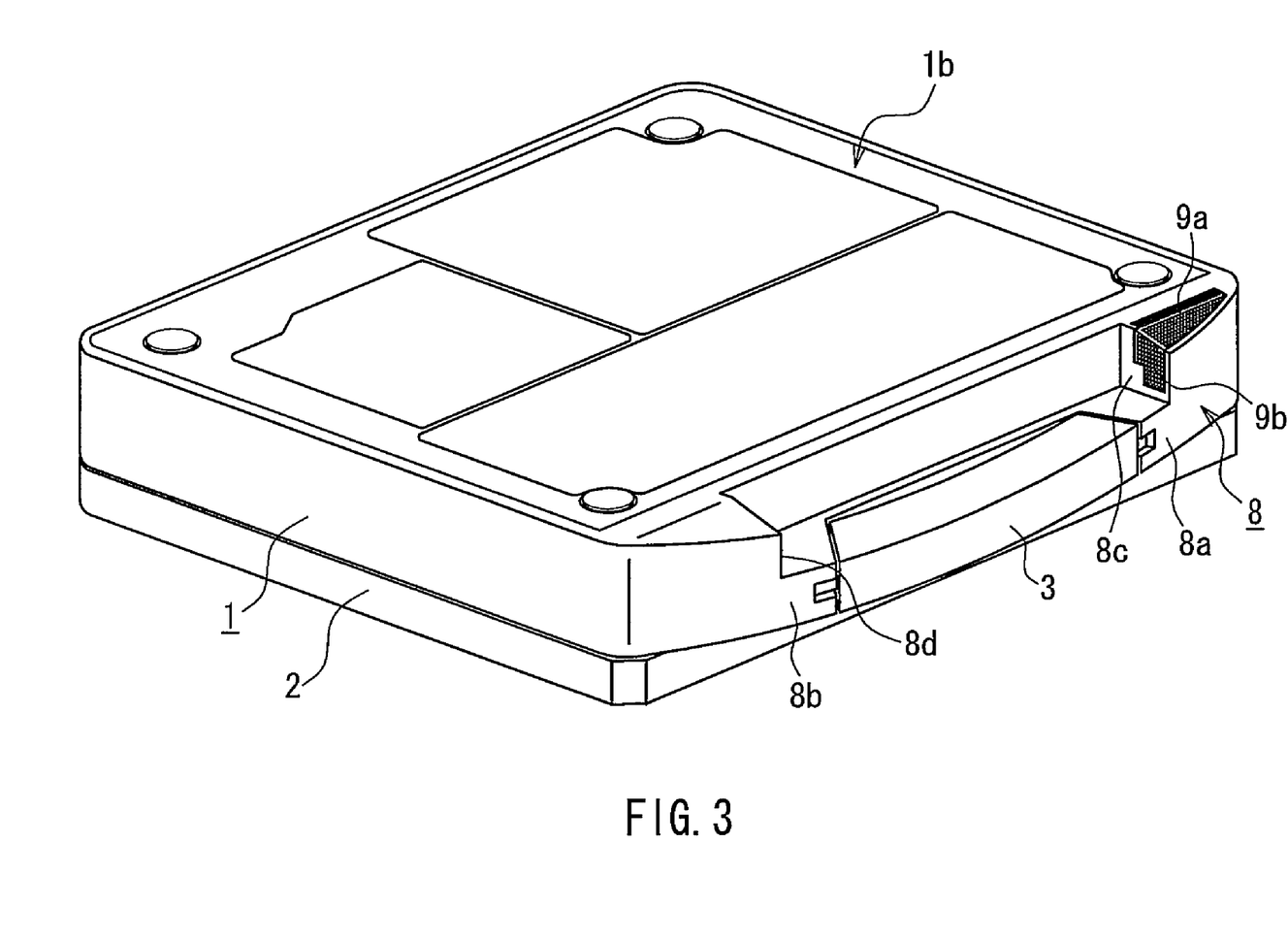
FIG. 3 is a perspective view of the notebook PC in the state of FIG. 1 when it is viewed from the back.

FIG. 3 is a perspective view showing a state in which the notebook PC in the state of FIG. 1 is placed face down. To provide the space between the hand grip 3 and the surface on which the notebook PC is placed in the state of FIG. 1, stepped portions 8c, 8d are formed between the connecting portions 8a, 8b and the surface of the grip holder 8 located on the same side as the main unit lower surface 1b, respectively. Moreover, the grip holder 8 on the right in FIG. 3 (the grip holder 8 with the connecting portion 8a, i.e., on the left in FIG. 1) has a first inlet 9a and a second inlet 9b to provide a part of the function of a heat dissipation unit, as will be described later.

The first inlet 9a is formed at the surface of the grip holder 8 located on the same side as the main unit lower surface 1b, and is substantially flush with the main unit lower surface 1b. The second inlet 9b is formed in the stepped portion 8c and continues to the first inlet 9a. The first inlet 9a and the second inlet 9b are made of, e.g., punching metal and ensure the ventilation characteristics due to their openings. However, the internal space of the main unit case 1 is not open directly through the Lust inlet 9a and the second inlet 9b. The grip holder 8 includes a small space that is outside the side wall defining the internal space of the main unit case 1, and the small space communicates with the external space through the first inlet 9a and the second inlet 9b.

Figure 4:
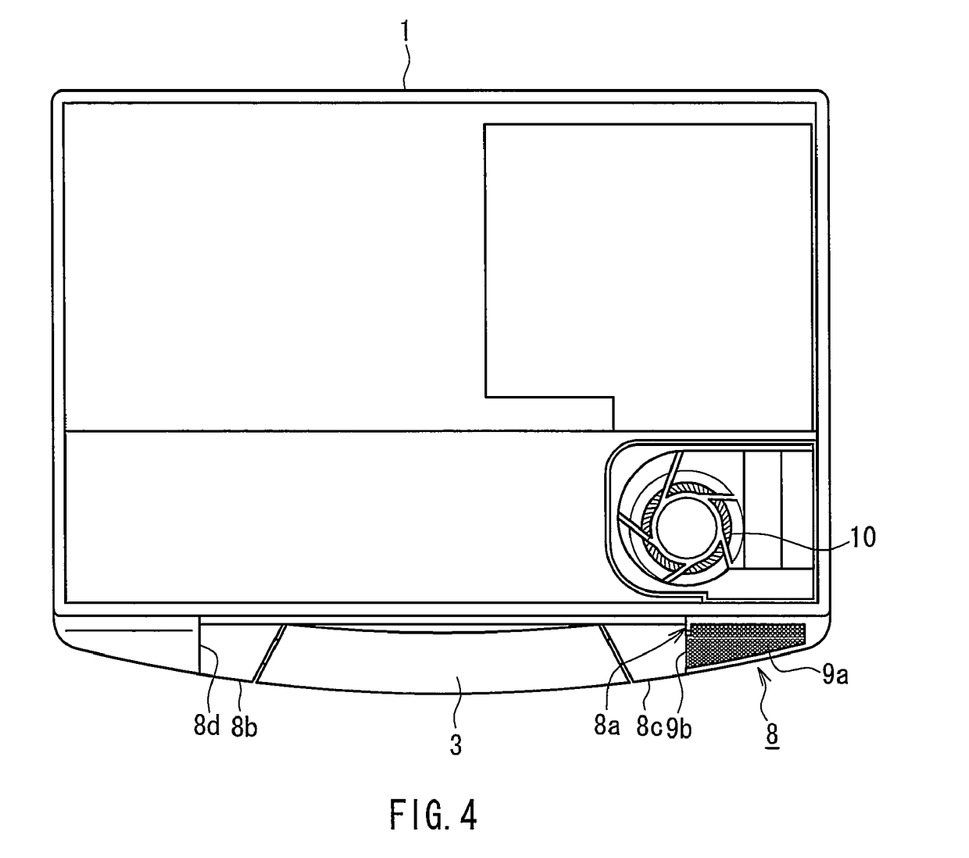
FIG. 4 is a schematic plan view of the internal structure of the notebook PC in the state of FIG. 3.
Figure 5:
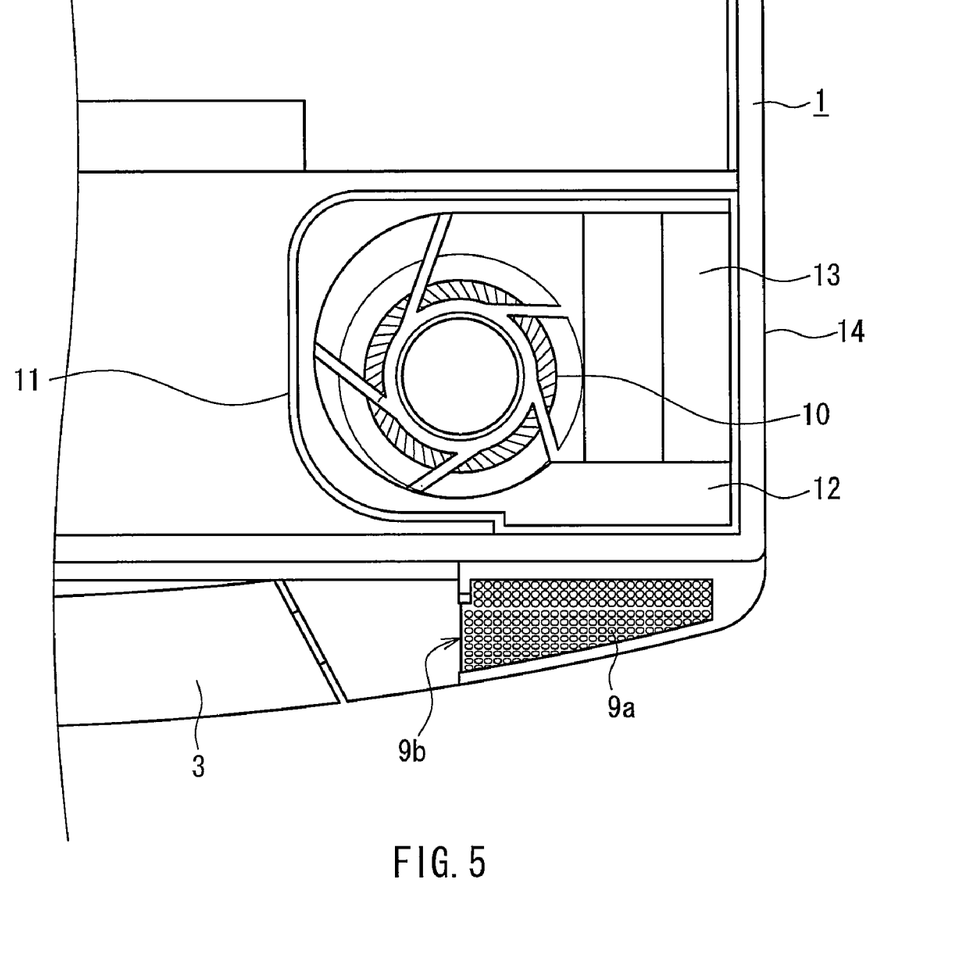
FIG. 5 is a partially enlarged plan view of the notebook PC in the state of FIG. 4.

FIG. 4 is a plan view showing a state in which the portion covering the back of the main unit case 1 (i.e., the main unit lower surface 1b) has been removed in the posture of the notebook PC shown in FIG. 3. FIG. 4 provides an overview of the internal structure of the notebook PC in this embodiment and illustrates only a particular part of the internal structure. This embodiment is characterized by the configuration associated with the heat dissipation unit including a blowing fan 10. Therefore, only the structure around the blowing fan 10 is shown specifically. FIG. 5 is an enlarged view of the area where the blowing fan 10 is located.

The blowing fan 10 is housed in a heat dissipation chamber 12 that is formed by separating the inside of the main unit case 1 with a partition 11. As shown in FIG. 4, the heat dissipation chamber 12 is located in the corner area in a plan view of the main unit case 1, and the partition 11 forms the bottom wall as well as the side wall of the heat dissipation chamber 12. That is, the partition 11 forms a case without the top wall. In the assembled state shown in FIGS. 1 to 3, a cover member (not shown) is attached to the top of the partition 11. The combination of the partition 11 and the cover member surrounds the heat dissipation chamber 12 to form a closed space. However, the cover member may be formed integrally with other elements such as a cover constituting the main unit lower surface 1b.

The heat dissipation chamber 12 includes a heat dissipation fin 13 that receives the air flow from the blowing fan 10. The end of a heat pipe (not shown) extended from the CPU is located in the heat dissipation chamber 12 and joined to the heat dissipation fin 13. Therefore, heat generated from the CPU is transferred to the heat dissipation fin 13 via the heat pipe, and the heat dissipation fin 13 constitutes a heat dissipation portion. The heat dissipation portion is not limited to indirect heat dissipation by transferring heat from the heat generating element via the heat pipe. In accordance with the circumstances, the heat generating element may be located directly in the heat dissipation portion, and the heat may be dissipated directly by the air flow from the blowing fan.

The partition 11 has water resistance to prevent water leakage between the heat dissipation chamber 12 and the inside of the main unit case 1. For example, a coupling element for connecting the blowing fan 10 to its driving portion and the heat pipe pass through the partition 11, and the portions of the partition 11 through which they are passing are provided with waterproof structures.

There are air vents (see FIG. 7) in the side walls of the main unit case 1 and the partition 11. The first inlet 9a and the second inlet 9b communicate with the heat dissipation chamber 12 through the air vents. Therefore, the blowing fan 10 draws air from the outside through the first inlet 9a and the second inlet 9b. The air vent of the main unit case 1 and the air vent of the partition 11 are connected by a structure to prevent water leakage. Since such a structure is well known, the detailed description and representation of the structure are omitted.

Figure 6:
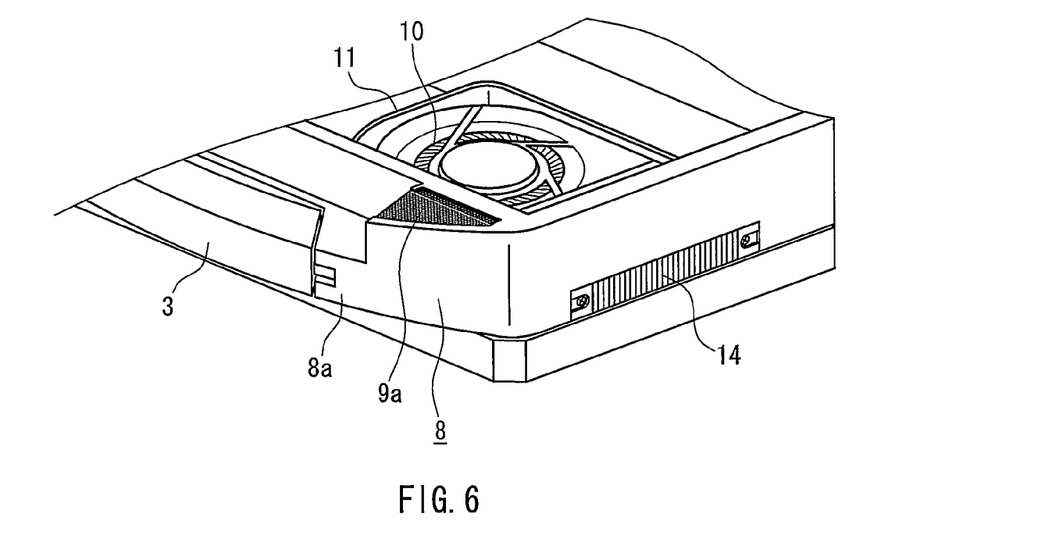
FIG. 6 is a perspective view of the portion of the notebook PC shown in FIG. 5 when it is viewed obliquely from the right front.

On the other hand, an outlet 14 is provided in the side of the main unit case 1 (the right side in FIG. 5) orthogonal to the side provided with the grip holder 8 that is adjacent to the heat dissipation chamber 12. FIG. 6 is a perspective view from the side of the outlet 14. Also, the outlet 14 communicates with the heat dissipation chamber 12, and the air flow sent from the blowing fan 10 to the heat dissipation fin 13 is discharged from the outlet 14.

As described above, the inlets through which the blowing fan 10 draws air from the outside are composed of the first inlet 9a and the second inlet 9b, so that the air intake can be performed reliably. For example, when using only the first inlet 9a, if the main unit lower surface 1b is covered with a cloth or the like, adequate air intake cannot be achieved. In contrast, when the second inlet 9b is provided on a different surface from the main unit lower surface 1b, the air intake from the second inlet 9b is ensured, and thus adequate air intake can be achieved.

The arrangement of the inlets in a plurality of surfaces of the main unit case 1 is more important than that of the outlet. This is because even if the outlet is covered with a cloth or the like, air is blown out through the outlet under pressure so as to take it away. Consequently, the air exhaust can be ensured. On the contrary, since air is drawn from the inlet, if the inlet is covered with a cloth or the like, the pressure causes the cloth or the like to stick to the inlet. Consequently, the air intake cannot be performed.

It is desirable that the first inlet 9a includes an inclined plane that is inclined from the main unit lower surface 1b toward the main unit upper surface 1a. FIGS. 3 and 6 show such an inclined structure of the first inlet 9a. When the first inlet 9a is inclined in this manner, a space is formed between the first inlet 9a and the surface on which the notebook PC is placed (e.g., a desk surface) in the operating state shown in FIG. 2. Due to the presence of this space, the first inlet 9a is less likely to be covered, e.g., when the notebook PC is placed on a surface having typical strength and rigidity such as a desk surface. Thus, the first inlet 9a can perform the air intake function sufficiently. Moreover, the second inlet 9b also serves to minimize the possibility that the air intake will be inadequate.

In the above configuration, the inlets are provided in two surfaces of the main unit case 1. However, without being limited thereto, the inlets may be provided in a plurality of surfaces at different angles of the main unit case 1, thereby ensuring adequate air intake. In the arrangement of the inlets, it is desirable that the second inlet is provided on at least one of the side of the main unit case 1 and the main unit upper surface 1a, in addition to the first inlet 9a on the main unit lower surface 1b. Accordingly, the second inlet is defined as including any inlet that is provided on a surface different from the surface on which the first inlet 9a is provided in the main unit case 1.

The electric apparatus in this embodiment has the characteristics that the heat dissipation chamber 12 is formed by separating the inside of the main unit case 1 with the partition 11, and the inlet and the outlet communicating with the heat dissipation chamber 12 are configured so as to satisfy the following conditions.

Figure 7:
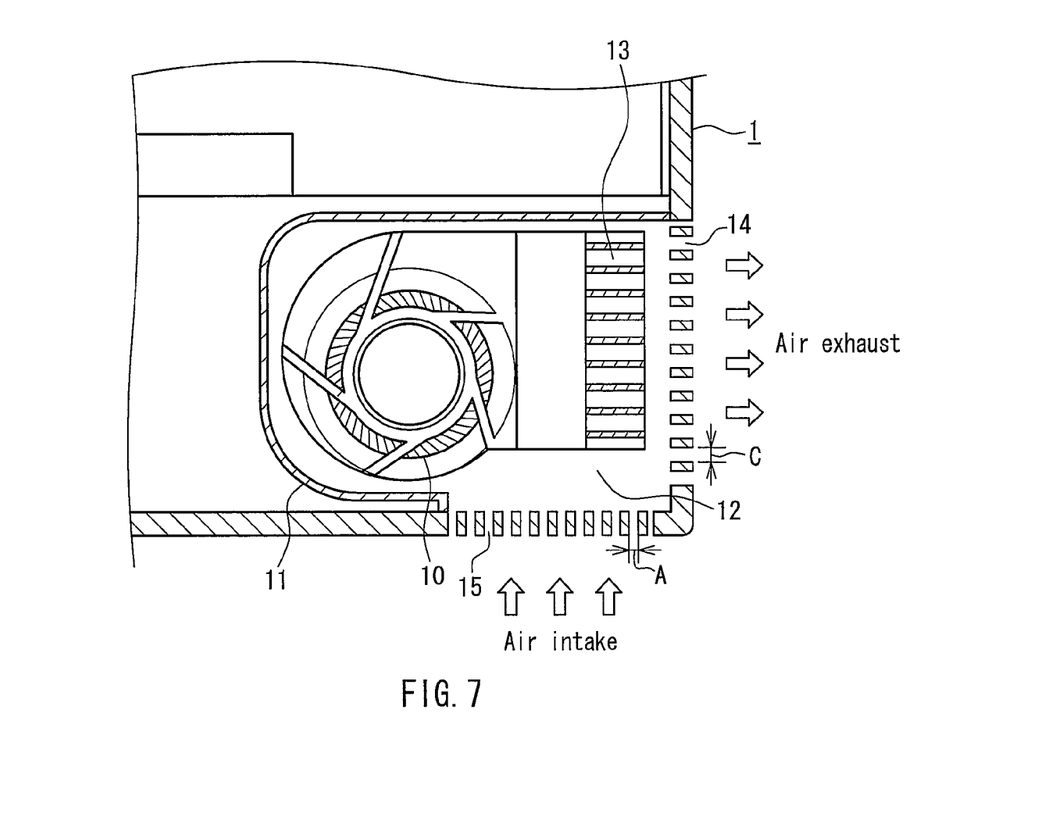
FIG. 7 is a plan view of the portion of the notebook PC shown in FIG. 5, a part of which is illustrated in a cross-sectional view.

FIG. 7 shows the area of the heat dissipation chamber 12 shown in FIG. 5 that constitutes the heat dissipation unit with the main unit case 1 and the partition 11 illustrated in a cross-sectional view. In FIG. 7, the grip holders 8, the first inlet 9a, the second inlet 9b, etc. are removed. The main unit case 1 has an inlet 15 that communicates with the heat dissipation chamber 12. The partition 11 has openings (not shown) in the portions opposed to the inlet 15 and the outlet 14.

The inlet 15 communicates with the first inlet 9a and the second inlet 9b, and the air flow passing through the first inlet 9a and the second inlet 9b enters the heat dissipation chamber 12 through the inlet 15. The inlet 15 and the outlet 14 are designed to satisfy the following conditions. On the other hand, it is possible to design the inlet 15 to have a fully opened configuration without a slit and design the first inlet 9a and the second inlet 9b to satisfy the following conditions. In such a configuration, the inlet 15 functions simply as an air vent. In FIG. 7, however, since the inlet 15 has the following function, the term "inlet" is used. In the example shown in FIG. 7, the inlet 15 and the outlet 14 have slits with a specific width. However, the inlet 15 and the outlet 14 may have an array of through holes with a specific diameter.

The dimensions of each of the inlet 15 and the outlet 14 are determined to satisfy the following relationship:

$$A < C, A < B$$

where A represents a width of each of the slits or a diameter of each of the through holes of the inlet 15, B represents a minimum particle size of dust that would compromise the dust-proof performance of the blowing fan 10, and C represents a width of each of the slits or a diameter of each of the through holes of the outlet 14.

By satisfying this relationship, the dimensions of each of the inlet 15 and the outlet 14 can be determined so as to maximize the cooling performance of the heat dissipation unit without causing damage or a reduction in the function of the blowing fan 10. Moreover, by satisfying this relationship, the inlet 15 can function as the finest filter, and thus the intake dust can be discharged reliably.

It is desirable that the dimensions of the outlet 14 are determined to satisfy $C \leq B$ in addition to the above relationship. This can prevent dust with a particle size that affects the dust-proof performance of the blowing fan 10 from entering through the outlet 14 in the non-operating state. Since the blowing fan 10 sends air toward the outlet 14, even if C=B, it is possible to suppress the flow of dust from the outlet 14 to the blowing fan 10 in the non-operating state. However C<B is preferred to provide reliable dust-proof performance.

It is further desirable that the dimensions of each of the outlet 14 and the heat dissipation fin 13 are determined to satisfy the following relationship:

$$C \leq D$$

where D represents a gap width between two adjacent fins of the heat dissipation fin 13. This can prevent the heat dissipation fin 13 from being clogged with dust that has entered from the outlet 14. Since the blowing fan 10 sends air toward the outlet 14 via the heat dissipation fin 13, even if C=D, it is possible to suppress the flow of dust from the outlet 14 to the blowing fan 10 in the non-operating state. However, C<D is preferred to provide reliable dust-proof performance.

The heat dissipation fin 13 may be included in the outlet 14. In this configuration, B, C, and D satisfy the relationship $C = D \leq B$.

The above description relates to an example in which this embodiment is applied to the configuration of the heat dissipation unit that uses the heat dissipation fin 13 for cooling in the notebook PC. However the present invention can be applied to various other aspects. The basic configuration of the present invention is applicable to a general blower that includes a fan to draw air from an inlet and exhausts air through an outlet. Thus, the effect of improving the blowing performance can be obtained within the range of dust-proof performance in which damage or functional degradation of the fan in the blower can be avoided.

Figure 8:
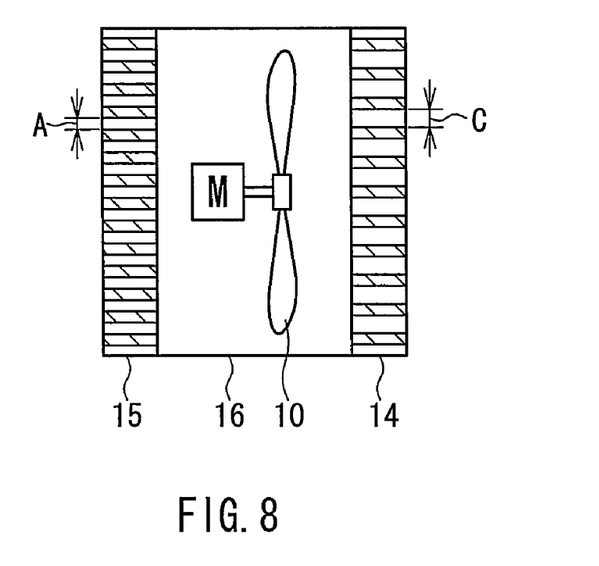
FIG. 8 is a cross-sectional view conceptually showing a basic configuration of a blower of the present invention.

Therefore, the basic configuration of the blower of the present invention is shown conceptually in FIG. 8. In FIG. 8, for the sake of simplifying the correspondence between the configuration and the above description, the outlet 14 and the inlet 15 are denoted by the same reference numerals. A fan region 16 indicates a portion that contributes to the blowing function, including the blowing fan 10 shown in FIG. 7 etc. Similarly to the above, the dimensions of each of the inlet 15 and the outlet 14 are determined to satisfy the relationship A <C, A <B, where A represents a width of each of the slits or a diameter of each of the through holes of the inlet 15, B represents a minimum particle size of dust that would compromise the dust-proof performance of the blowing fan 10, and C represents a width of each of the slits or a diameter of each of the through holes of the outlet 14.

In the basic configuration of the blower of the present invention, the fan region 16 does not have to be shielded from the surroundings. That is, even if a partition 17 (shown in FIG. 9) is not provided to shield the fan region 16 from the surroundings, the above effects can be obtained.

Figure 9:
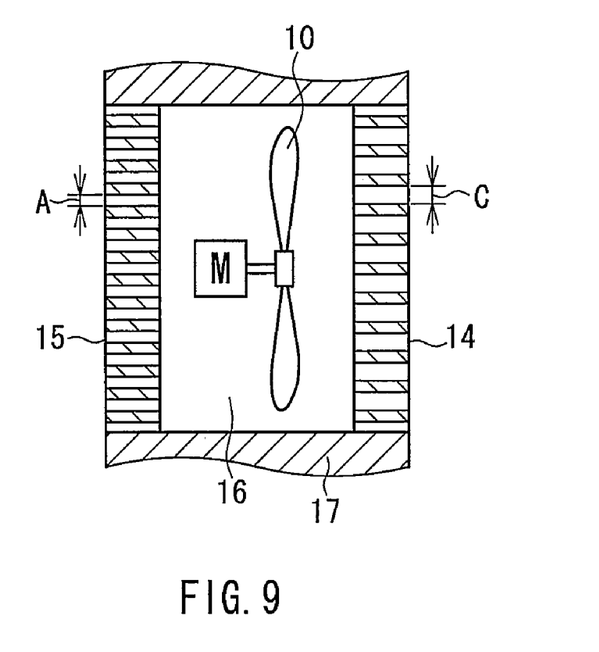
FIG. 9 is a cross-sectional view conceptually showing a configuration of a specific application example of the blower.

The aspect in FIG. 9 corresponds to the configuration in which the heat dissipation chamber 12 (partitioned chamber) is separated by the partition 17, as shown in FIG. 7 etc. That is, the partition 17 separates the unit from the inside of the main unit case, thereby providing a partitioned chamber. As an application example of this aspect, the configuration of the heat dissipation unit of the above notebook PC can be shown in FIG. 10. In this configuration, there is a space between the fan region 16 and the outlet 14, and the heat dissipation fin 13 (i.e., a heat-exchange element) is located in the space. However, the heat dissipation fin 13 may be included in the outlet 14.

To ensure the effects obtained by meeting the above conditions, it is desirable that the heat dissipation chamber 12, which is formed by separating the inside of the main unit case 1 with the partition 17, is sealed from the internal space of the main unit case 1 in terms of practical use. Moreover, it is desirable that the heat dissipation chamber 12 is located in the corner area of the main unit case 1. Accordingly, the inlet 15 is provided in the side wall that forms one side of the corner area, and the outlet 14 is provided in the side wall that intersects this side wall. Thus, the ventilation efficiency can be improved.

Embodiment 2

Figure 10:
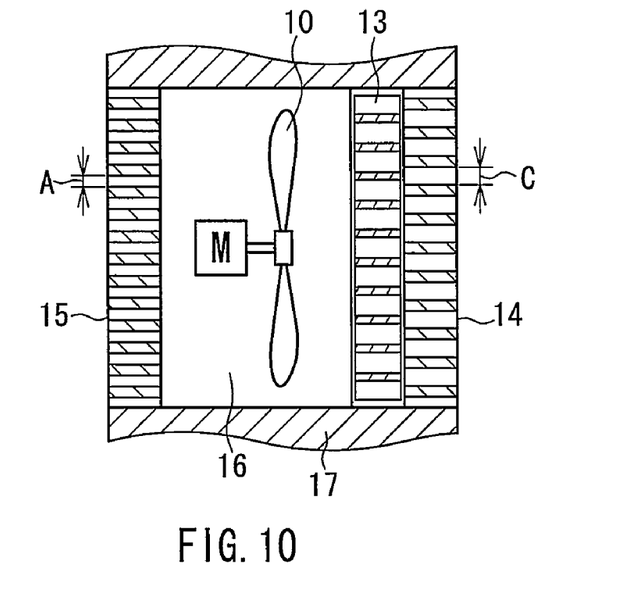
FIG. 10 is a cross-sectional view conceptually showing an aspect of the blower that is applied to a heat dissipation unit of the notebook PC shown in FIG. 7.
Figure 11:
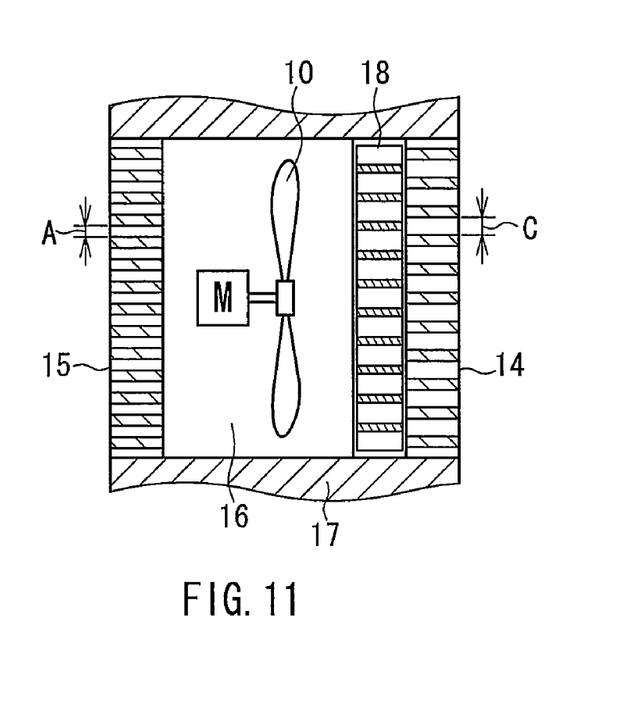
FIG. 11 is a cross-sectional view conceptually showing a heat dissipation unit of a warm-air blower in Embodiment 2 of the present invention.

FIG. 11 is a cross-sectional view conceptually showing a heat dissipation unit of a warm-air blower as an example of an electric apparatus in Embodiment 2 of the present invention. In the basic configuration of this heat dissipation unit, the heat dissipation fin 13 of the heat dissipation unit of the notebook PC shown in FIG. 10 is replaced by a heater 18 (i.e., another heat-exchange element).

Figure 12:
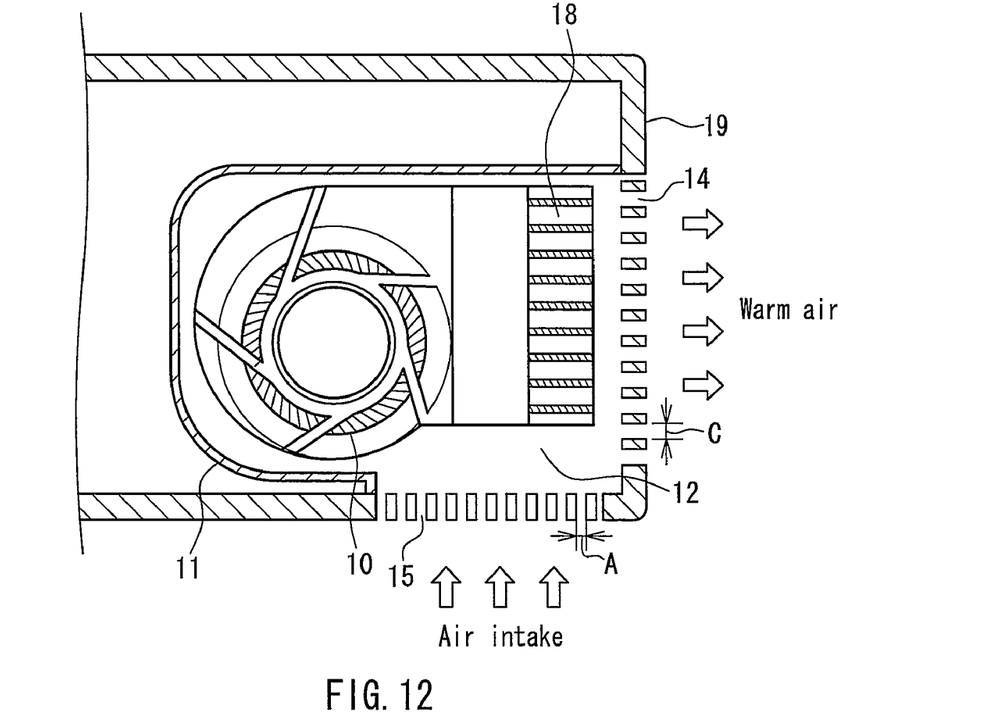
FIG. 12 is a cross-sectional view showing a specific configuration of the warm-air blower including the heat dissipation unit.

FIG. 12 is a cross-sectional view showing an example of a specific configuration of the warm-air blower including the heat dissipation unit. Since the basic configuration of this heat dissipation unit is the same as that of the heat dissipation unit shown in FIG. 7 in Embodiment 1, the same components are denoted by the same reference numerals, and a part of the explanation will not be repeated.

In this embodiment, the heat dissipation chamber 12 is formed inside a main unit case 19 of the warm-air blower and separated by the partition 11. The heat dissipation chamber 12 includes the heater 18 serving as a heat generating element that generates heat, instead of the heat dissipation fin 13 shown in FIG. 7. Thus, the heat generating element itself is located in the heat dissipation chamber 12. The temperature of air from the blowing fan 10 is increased when the air passes through the heater 18, so that warm air is exhausted from the outlet 14.

Like Embodiment 1, this heat dissipation unit is manufactured to satisfy the following conditions. The dimensions of each of the inlet 15 and the outlet 14 are determined to satisfy the following relationship:

$$A<C, A<B$$

where A represents a width of each of the slits or a diameter of each of the through holes of the inlet 15, B represents a minimum particle size of dust that would compromise the dust-proof performance of the blowing fan 10, and C represents a width of each of the slits or a diameter of each of the through holes of the outlet 14.

By satisfying this relationship, the dimensions of each of the inlet 15 and the outlet 14 can be determined so as to maximize the warm-air blowing performance of the heat dissipation unit without causing damage or a reduction in the function of the blowing fan 10. Moreover, by satisfying this relationship, the inlet 15 can functions as the finest filter, and thus the intake dust can be discharged reliably.

It is desirable that the dimensions of the outlet 14 are determined to satisfy $C \leqq B$ in addition to the above relationship. This can prevent dust with a particle size that affects the dust-proof performance of the blowing fan 10 from entering through the outlet 14 in the non-operating state. Since the blowing fan 10 sends air toward the outlet 14, even if C=B, it is possible to suppress the flow of dust from the outlet 14 to the blowing fan 10 in the non-operating state. However, C<B is preferred to provide reliable dust-proof performance.

Embodiment 3

Figure 13:
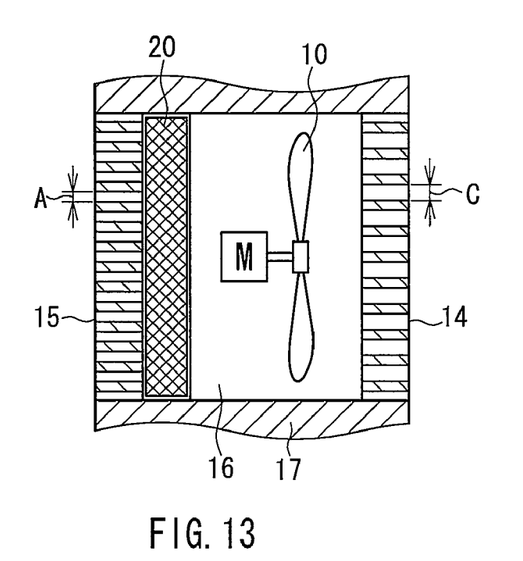
FIG. 13 is a cross-sectional view conceptually showing a dust collector of a vacuum cleaner in Embodiment 3 of the present invention.

FIG. 13 is a cross-sectional view conceptually showing a dust collector composing, for example, a vacuum cleaner in Embodiment 3 of the present invention. In this configuration, there is a space between the fan region 16 and the inlet 15, and a dust collecting element 20 is located in the space. However, the dust collecting element 20 may be included in the inlet 15.

In this configuration, similarly to the above, the dimensions of each of the inlet 15 and the outlet 14 are determined to satisfy the relationship A <C, A <B where A represents a width of each of the slits or a diameter of each of the through holes of the inlet 15, B represents a minimum particle size of dust that would compromise the dust-proof performance of a fan in the fan region 16, and C represents a width of each of the slits or a diameter of each of the through holes of the outlet 14. Thus, the effect of improving both the blowing performance and the dust collection capability can be obtained within the range of dustproof performance in which damage or functional degradation of the fan can be avoided.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An electric apparatus comprising:
a main unit case having an exterior wall;
a partitioned chamber that is formed by separating an inside of the main unit case with a partition;
a heat-exchange element that is located in the partitioned chamber; and
a blower comprising a fan, located in the partitioned chamber to send air to the heat-exchange element,
an inlet, defined by a plurality of openings, and communicating with the partitioned chamber, through which outside air is drawn and sent by the fan; and
an outlet, defined by a plurality of openings, and communicating with the partitioned chamber, through which an air flow sent from the fan is exhausted outside the apparatus,
wherein the heat-exchange element is located between the fan and the outlet.

2. The electric apparatus according to claim 1, wherein the heat-exchange element includes a heat dissipation fin that dissipates heat transferred from a heat generating element located inside the main unit case and outside the partitioned chamber.

3. The electric apparatus according to claim 1, wherein the heat-exchange element is a heat generating element that generates heat.

4. The electric apparatus according to claim 1, wherein the partitioned chamber is formed in a corner area in a plan view of the main unit case by separating the inside of the main unit case with the partition, and is sealed from an internal space of the main unit case.

5. The electric apparatus according to claim 4, wherein the inlet is provided in a side wall that forms one side of the corner area, and the outlet is provided in a side wall that forms the other side that intersects the one side provided with the inlet.

6. The electric apparatus according to claim 1, wherein the partition for partitioning the partitioned chamber is formed of a partition member different from the main unit case, and the partition member surrounds the partitioned chamber to form a closed space.

7. The electric apparatus according to claim 1, further comprising a display unit case rotatably supported by the main unit case,
wherein the main unit case comprises a top surface provided with a user input and a bottom surface opposed to the top surface.

8. The electric apparatus according to claim 1, wherein the individual openings of the inlet define smaller air passages than the individual openings of the outlet.

9. An electric apparatus comprising:
a main unit case having an exterior wall;
a partitioned chamber that is formed by separating an inside of the main unit case with a partition; and
a blower comprising a fan, located in the partitioned chamber,
an inlet, defined by a plurality of openings, and communicating with the partitioned chamber, through which outside air is drawn and sent by the fan; and
an outlet, defined by a plurality of openings, and communicating with the partitioned chamber, through which an air flow sent from the fan is exhausted outside the apparatus,
wherein the inlet includes a dust collecting element that collects dust.

10. The electric apparatus according to claim 7, wherein the inlet comprises a set of openings on the bottom surface.

11. The electric apparatus according to claim 10, wherein the outlet comprises a set of openings on a first surface perpendicular to the bottom surface.

12. The electric apparatus according to claim 11, wherein the inlet further comprises a set of openings on a second surface perpendicular to the bottom surface.

* * * * *